C. ANDRESEN.
RESILIENT WHEEL.
APPLICATION FILED OCT. 10, 1912.
1,067,296.
Patented July 15, 1913.
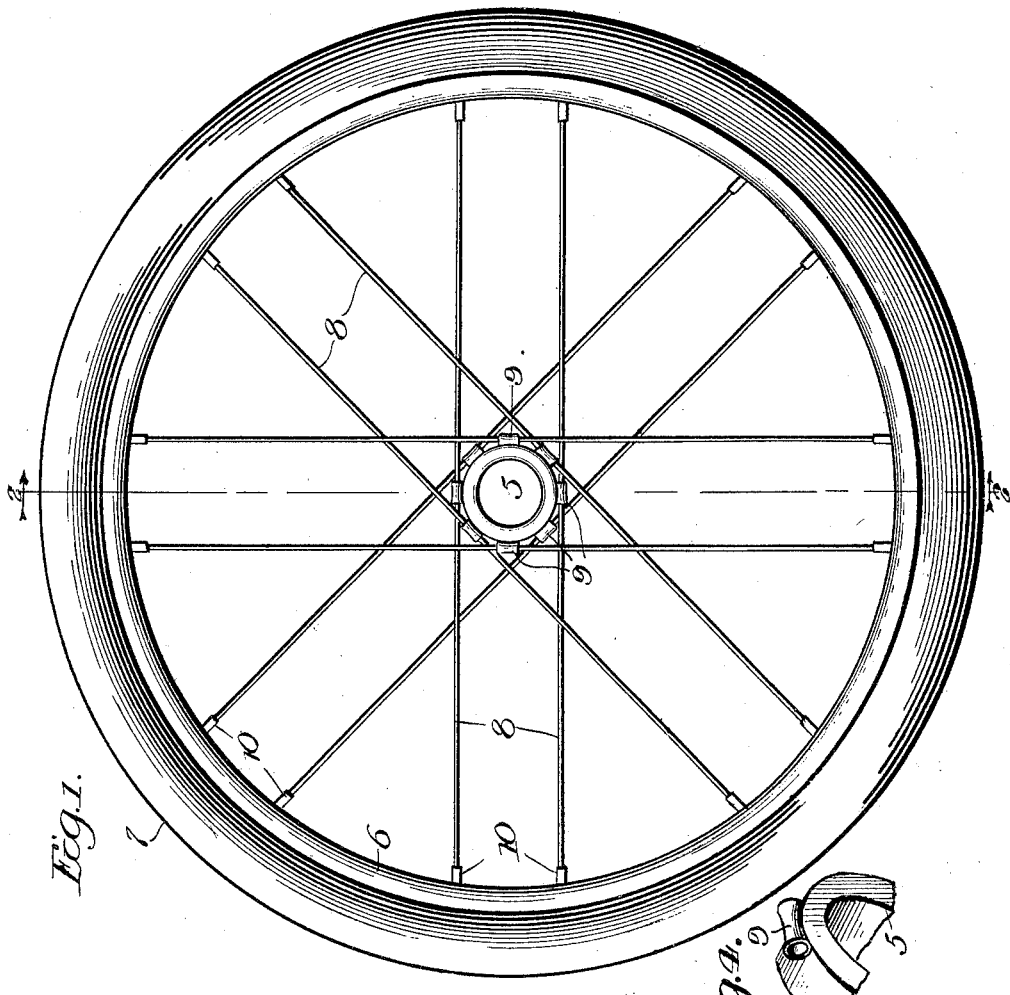
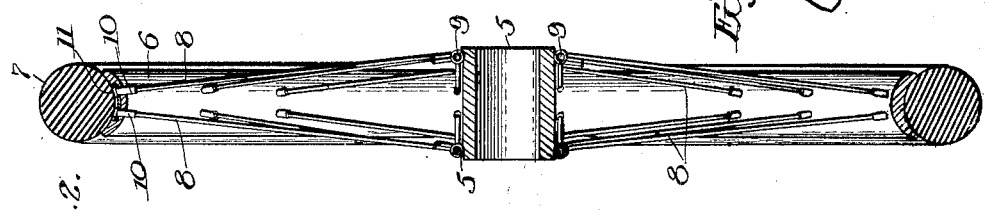
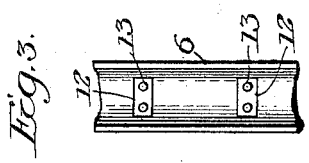
Witnesses
Inventor
Christian Andresen

UNITED STATES PATENT OFFICE.

CHRISTIAN ANDRESEN, OF CHICAGO, ILLINOIS.

RESILIENT WHEEL.

1,067,296.  Specification of Letters Patent.  Patented July 15, 1913.

Application filed October 10, 1912. Serial No. 725,081.

*To all whom it may concern:*

Be it known that I, CHRISTIAN ANDRESEN, a citizen of the United States of America, residing at Chicago, in the county of Cook and State of Illinois, have invented certain new and useful Improvements in Resilient Wheels, of which the following is a specification.

This invention relates to improvements in resilient wheels for vehicles, and the objects thereof are to provide wheels of this character, which will effectively abolish jolting and jarring when the vehicle is in motion, and which will assist in the propulsion of the vehicle by means of the novel arrangement of a series of transversely disposed flexible spokes loosely secured to the hub, in pairs either partially or wholly in substantial parallelism, in such a way as to allow them to slide freely on the hub and thereby tend to throw the hub off the dead center when the wheel is in motion. By this peculiar arrangement any obstruction, blow, or jolt received by the outside of the wheel will be dissipated in the spokes and practically no effect will be transmitted to the hub, thereby insuring ease and comfort in riding. The flexibility of the spokes allowing the hub to move forward or backward a slight distance before the wheel begins to move, also serves to protect engines and gearing on motor vehicles from violent abuse when equipped with wheels of this kind.

The construction and arrangement is exceedingly durable, effective, and at the same time comparatively inexpensive and simple.

In the accompanying drawing, which serves to illustrate an embodiment of the invention—Figure 1 is a face view of a wheel showing one form of the construction of the same; Fig. 2 is a vertical central sectional view taken on the line 2—2 of Fig. 1, looking in the direction indicated by the arrows; Fig. 3 is an external view of a portion of the rim or felly, and Fig. 4 is a fragmental perspective view of a portion of the hub.

Like numerals of reference refer to corresponding parts throughout the different views of the drawing which, in the present instance, illustrates a wheel of the type ordinarily used on bicycles and motor-cycles, and sometimes on automobiles of light construction or for light work, with my improvements embodied therein, but I desire it to be distinctly understood that I do not wish to be limited in the use of my invention to wheels of any specific type, as it may be applied or used in connection with wheels of various kinds and for various purposes, and consists of a hub 5, a rim or felly 6, tire 7, and a series of flexible spokes or rods 8, which support the hub and movably unite it to the rim or felly. This hub is provided on its outer surface near each of its ends with a plurality of tubular members 9, each of which is by preference slightly flared at each end, as will be understood by reference to Figs. 1 and 4 of the drawing, and are located tangentially with respect to the hub, and in the plane of the wheel. Extended through each of the members 9, is a rod or spoke 8, each of which may have their ends connected to the rim or felly 6, by means of internally screw threaded nipples 10, which are located in openings in the felly or rim, and project inwardly therefrom as shown. Each of the nipples 10, has on its outer end a head 11, to rest against the outer surface of a plate 12, which plates are provided with apertures 13, for the nipples and are secured or located on the outer surface of the rim 6, at suitable distances apart.

As shown in Fig. 1, the rods or spokes 8, are arranged in pairs and the members of each pair are located in parallelism with one another and on opposite sides of the hub. It will also be observed by reference to said figure of the drawing, that each pair of the rods or spokes 8, is located at an angle to the adjacent pairs thereof, and it will be understood that as the members 8, of each pair are loosely connected to the hub, in the present instance by means of the members 9, movement of the spokes with respect to the hub will be permitted as soon as the wheel is moved, and that as the spokes or rods 8, are made of flexible or resilient material they will afford a resilient support for the hub and axle of the vehicle.

Assuming that the wheel is standing still and that an axle of a vehicle is journaled in the hub 5, and power is applied to said vehicle to move it in the direction indicated by the arrows in Fig. 1, of the drawing, it is apparent that the hub will be thrown off of the dead or vertical center of the wheel in the direction indicated, and that the weight of the vehicle will thereby be lodged at a slight distance in the direction of the movement of the vehicle from the dead center or vertical axis of the wheel, thus utilizing the weight of the vehicle in its propulsion.

While I have shown in Figs. 1 and 2 of the drawing a wheel equipped with spokes or rods 8, arranged and connected as above described to the hub near each of its ends, yet it will be understood that I may employ such arrangement and construction of the parts without departing from the spirit of the invention, which, broadly, is the employment of a plurality of flexible spokes connected at their ends to the outer portion of the wheel and arranged in pairs with the central portion of each pair in substantial parallelism and in loose engagement with the hub, which latter is located between the members of each of the several pairs of spokes.

Having thus fully described my invention, what I claim as new and desire to secure by Letters Patent is—

A resilient wheel consisting of a rim, a series of flexible spokes having their ends connected to the rim and arranged in pairs with the central portion of the members of each pair in substantial parallelism, a hub located between the central portion of each pair of said spokes, and tubular members having flaring openings at their ends secured to the hub and each loosely engaging one of said spokes.

In witness whereof I have hereunto subscribed my name, this 9th day of October A. D. 1912, in the presence of two subscribing witnesses.

CHRISTIAN ANDRESEN.

Witnesses:
  CHAS. C. TILLMAN,
  A. S. PHILLIPS.

---

Copies of this patent may be obtained for five cents each, by addressing the "Commissioner of Patents, Washington, D. C."